United States Patent
Lin et al.

(10) Patent No.: US 8,194,052 B2
(45) Date of Patent: Jun. 5, 2012

(54) OPTICAL OPERATING APPARATUS

(75) Inventors: Cho-Yi Lin, Hsinchu (TW); Yao-Ching Hsu, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 805 days.

(21) Appl. No.: 12/265,255

(22) Filed: Nov. 5, 2008

(65) Prior Publication Data

US 2009/0284497 A1   Nov. 19, 2009

Related U.S. Application Data

(63) Continuation-in-part of application No. 12/119,641, filed on May 13, 2008.

(30) Foreign Application Priority Data

Jun. 6, 2008   (TW) ................................ 97121284 A

(51) Int. Cl.
  G06F 3/042   (2006.01)
  G06F 3/041   (2006.01)
(52) U.S. Cl. .................. 345/176; 345/173; 345/175
(58) Field of Classification Search .................. 345/176
   See application file for complete search history.

(56) References Cited

U.S. PATENT DOCUMENTS

2008/0007540 A1* 1/2008 Ostergaard .................... 345/176
2008/0088593 A1   4/2008 Smoot

FOREIGN PATENT DOCUMENTS

| CN | 200983603 Y | 11/2007 |
|---|---|---|
| TW | 200601127 A | 1/2006 |
| TW | 200705249 A | 2/2007 |
| TW | 200813793 A | 3/2008 |

* cited by examiner

Primary Examiner — Alexander S Beck
Assistant Examiner — Charles V Hicks
(74) Attorney, Agent, or Firm — Chun-Ming Shih

(57) ABSTRACT

An optical operating apparatus includes a display panel, a transparent supporting plate, a deformable unit, a light source, an image sensing module, a function selecting module and a processing module. The deformable unit is disposed between the transparent supporting plate and the display panel. The deformable unit has a pattern configuration. The deformable unit deforms as applying an external force on the display panel and restores after the external force is removed. The light source provides a light beam to the deformable unit, and a visual field of the image sensing module covers the whole deformable unit. The function selecting module is disposed beside the display panel and has a plurality of function selecting buttons for selecting a predetermined function. The processing module is electrically connected with the display panel, the function selecting module, the image sensing module and the light source. The processing module is configured to control the display panel to display a predetermined picture according to a corresponding predetermined function.

11 Claims, 8 Drawing Sheets

OPTICAL OPERATING APPARATUS

This application is a continuation-in-part application of U.S. patent application Ser. No. 12/119,641, filed on May 13, 2008.

BACKGROUND

1. Field of the Invention

The present invention relates to an operating apparatus, particularly, to an optical operating apparatus.

2. Description of Related Art

With the development of flat panel display technology, more and more electronic products have a screen. In these electronic products, many products are operated by moving the cursors in the screens. Generally, two typical operating apparatuses, i.e., resistive operating apparatus and capacitive operating apparatus, are used to move the cursor in the screen. Because the resistive operating apparatus has low sensitivity, in practical application, the resistive operating apparatus is prone to suffer too much pressure and tends to be damaged. In addition, the capacitive operating apparatus has high price, and is easy to cause operating error because of electrostatic force or humidity.

Furthermore, a conventional joystick is used as an operating apparatus for operating video game. Recently, an operating apparatus capable of being controlled by feet of an user is developed. The feet of the user are placed on the operating apparatus, and a pressure change of the feet can be sensed. According to the sensed pressure change, the operating apparatus controls a role in the video game doing a corresponding operation motion. However, the operating apparatus still belongs to resistive operating apparatus or capacitive operating apparatus.

BRIEF SUMMARY

An optical operating apparatus having high reliability and multiple operating modes is provided.

In order to achieve the above-mentioned merits, an embodiment of an optical operating apparatus is provided. The optical operating apparatus includes a display panel, a transparent supporting plate, a deformable unit, a light source, an image sensing module, a function selecting module and a processing module. The transparent supporting plate is disposed under the display panel. The deformable unit is disposed between the transparent supporting plate and the display panel, and has a pattern configuration. The deformable unit deforms as applying an external force on the display panel and restores after the external force is removed. The light source is configured for providing a light beam to the transparent supporting plate and the deformable unit. The image sensing module is arranged on a transmitting path of the light beam reflected by the deformable unit. A visual field of the image sensing module covers the whole deformable unit. The function selecting module is disposed beside the display panel. The function selecting module has a plurality of function selecting buttons for selecting one of predetermined functions. The processing module is electrically connected to the display panel, the function selecting module, the image sensing module and the light source. The processing module is configured to control the display panel to display a predetermined picture according to the predetermined function selected by an user.

In one embodiment of the present invention, the deformable unit is made of an elastic material.

In one embodiment of the present invention, the pattern configuration can be a predetermined reticular structure or a multi-line shaped structure.

In one embodiment of the present invention, the image sensing module is disposed under the transparent supporting plate.

In one embodiment of the present invention, the optical operating apparatus additionally comprises a light guide plate disposed between the transparent supporting plate and the image sensing module, and the light source is disposed adjacent to an incident surface of the light guide plate.

In one embodiment of the present invention, the display panel is a dot-matrix liquid crystal display panel.

In one embodiment of the present invention, the processing module comprises a processor, a display unit, a function unit and a multiplexer. The processor is electrically connected to the image sensing module and the light source. The display unit is electrically connected to the processor and the display panel. The function unit is electrically connected to the processor. The multiplexer is electrically connected to the function selecting module, the display unit and the function unit. In addition, the processing module further comprises a wireless module electrically connected to the processor.

In one embodiment of the present invention, the processing module comprises a processor, a first multiplexer, a second multiplexer and a graphic generator. The processor is electrically connected to the image sensing module, the light source, the function selecting module, the first multiplexer and the second multiplexer. The graphic generator is electrically connected to the display panel and the second multiplexer. In addition, the processing module further comprises a wireless module electrically connected to the processor.

The optical operating apparatus employs an optical manner to sense a change of the pressure, therefore, any operating error caused by electrostatic force or humidity can be prevented. The pressure is not exerted on the image sensing module, thereby avoiding a damage of the image sensing module. Therefore, the optical operating apparatus has high reliability. In addition, the optical operating apparatus has a function selecting module and therefore has multiple operating modes.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
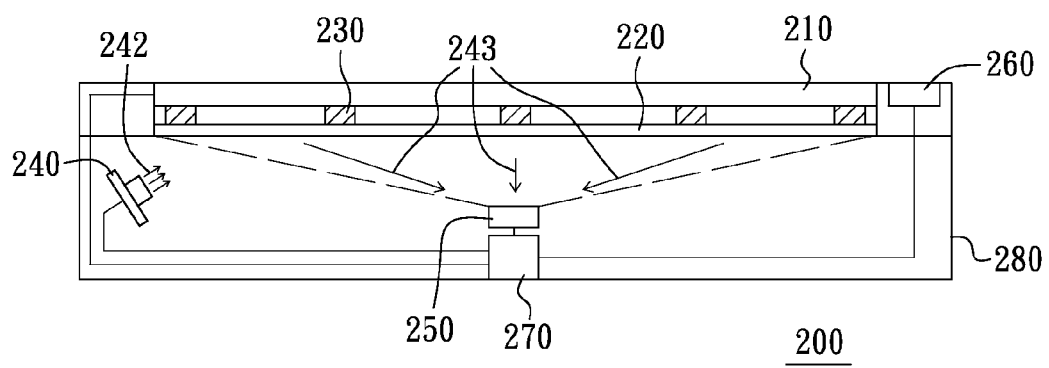
FIG. 1 is a schematic view of an optical operating apparatus of an embodiment of the present invention.
Figure 2:
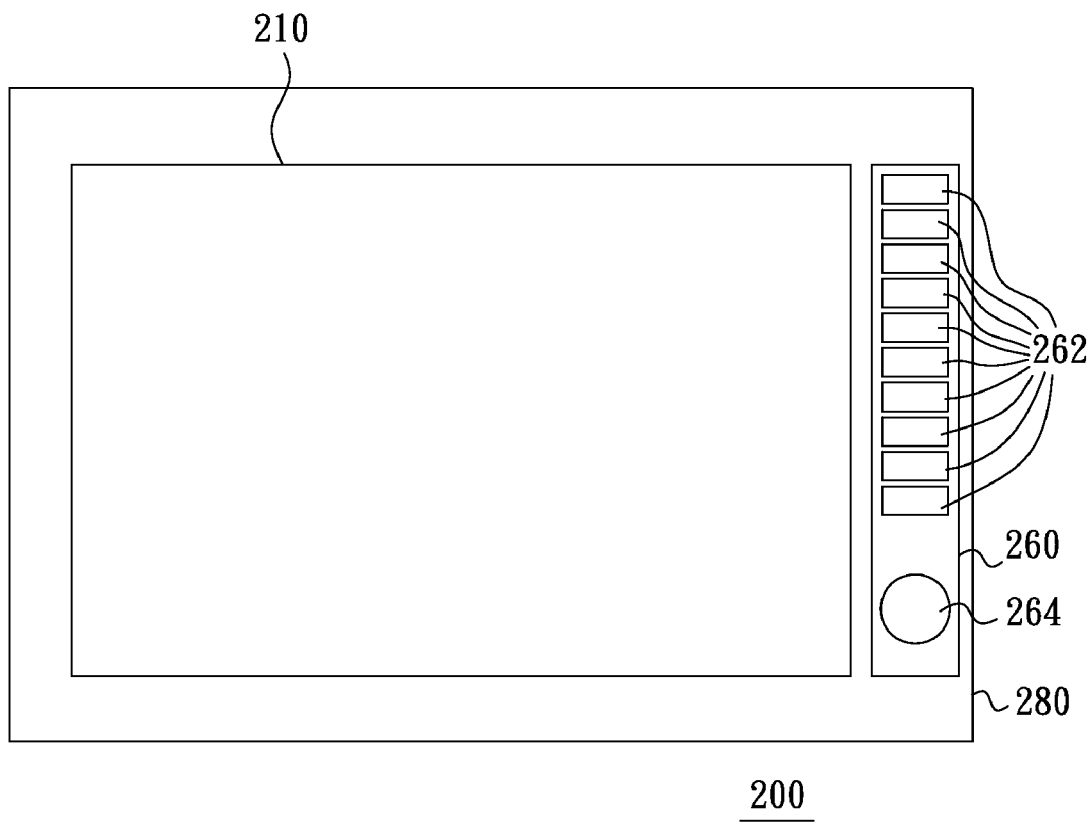
FIG. 2 is a top view of the optical operating apparatus of FIG. 1.
Figure 3:
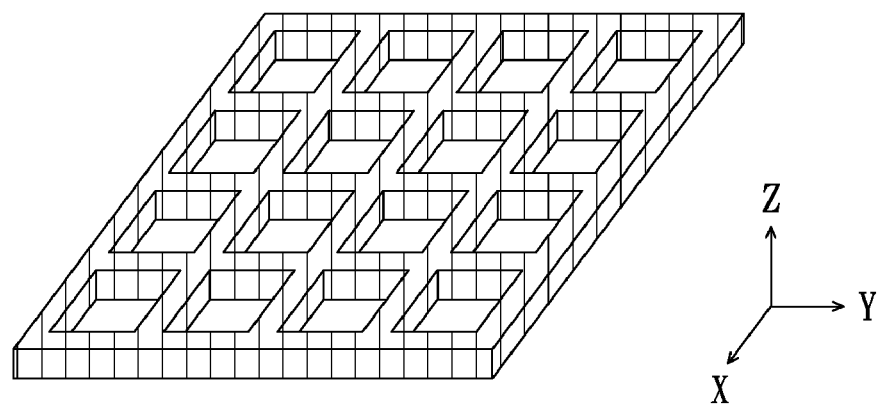
FIG. 3 is a three-dimensional view of a deformable unit of the optical operating apparatus of FIG. 1.

FIG. 1 is a schematic view of an optical operating apparatus of an embodiment of the present invention, FIG. 2 is a top view of the optical operating apparatus of FIG. 1 and FIG. 3 is a three-dimensional view of a deformable unit of the optical operating apparatus of FIG. 1. Referring to FIGS. 1 to 3, an optical operating apparatus 200 of the present embodiment can be connected to an electronic device, such as a computer, a television, a game player, and so on. The optical operating apparatus 200 includes a display panel 210, a transparent supporting plate 220, a deformable unit 230, a light source 240, at least one image sensing module 250, a function selecting module 260 and a processing module 270. The transparent supporting plate 220 is disposed under the display panel 210. The deformable unit 230 is arranged between the transparent supporting plate 220 and the display panel 210. The deformable unit 230 has a pattern configuration (e.g., a predetermined reticular configuration as shown in FIG. 3). The deformable unit 230 deforms as applying an external force on the display panel 210 and restores after the external force is removed. The light source 240 is configured for providing a light beam 242 to the transparent supporting plate 220 and the deformable unit 230. The image sensing module 250 is arranged on a transmitting path of the light beam 242 reflected by the deformable unit 230, and a visual field (i.e., a sensing range) of the image sensing module 250 covers the whole deformable unit 230. The function selecting module 260 is arranged beside the display panel 210, and the function selecting module 260 has a plurality of function selecting buttons 262 for selecting one of predetermined functions. The processing module 270 is electrically connected to the display panel 210, the light source 240, the image sensing module 250, and the function selecting module 260. The processing module 270 is configured for displaying a predetermined picture according to the predetermined function selected by an user and processing the operating motion exerted on the predetermined picture. In addition, the processing module 270 can also adjust light intensity of the light source 240 by sensing the brightness of the predetermined picture through the image sensing module 250.

In the above-described optical operating apparatus 200, the image sensing module 250 is, for example, arranged under the transparent supporting plate 220. The image sensing element 250 can be a complementary metal-oxide-semiconductor (CMOS) image sensor or a charge coupled device (CCD). In addition, the optical operating apparatus 200 can additionally include a housing 280. The display panel 210, the transparent supporting plate 220, the deformable unit 230, the light source 240, the image sensing module 250, the function selecting module 260 and the processing module 270 are disposed inside the housing 280. The display panel 210 and the function selecting module 260 are exposed from the housing 280. Moreover, the light source 240 can be a laser diode (LD), or a light emitting diode (LED), such as an infrared LED. The display panel 210 can be a dot-matrix liquid crystal display (LCD) panel. The transparent supporting plate 220 can be comprised of glass, polyacrylate, resin, rubber, thermoplastic elastomer (TPE) or other transparent materials. The deformable unit 230 is can be comprised of an elastic material such as silica gel, latex, sponge, rubber, TPE or the like.

In the present embodiment, the function selecting module 260 of the optical operating apparatus 200 includes a plurality of function selecting buttons 262. When the different function selecting buttons 262 are pressed by the user, the display panel 210 displays different pictures controlled by the processing module 270. For example, when one of the function selecting buttons 262 is pressed to select a predetermined function, e.g., a drawing board function, the display panel 210 controlled by the processing module 270 displays a blank picture (as shown in FIG. 2). In this circumstance, the optical operating apparatus 200 is used as a drawing board.

As described above, the deformable unit 230 is leant against the display panel 210 and the transparent supporting plate 220, so when the user presses the display panel 210, the display panel 210 and the deformable unit 230 deform accordingly. Furthermore, the light beam 243 reflected by the deformable unit 230 transmits to the image sensing module 250. Then the light beam 243 is converted into an image data by the image sensing module 250. According to compare the image data got in different times, whether the deformable unit 230 deforms or not is determined, and the deformed position of the deformable unit 230 is determined. According to the determined result, a drawing picture drawn by the user is displayed on a screen of an electronic device connected to the optical operating apparatus 200. In detail, the image sensing module 250 is capable of sensing deformed positions (i.e., the deformed positions of X axis and Y axis) of the deformable unit 230 in different times. According to a moving track of the deformed positions, the processing module 270 enables the screen of the electronic device connected to the optical operating apparatus 200 displaying a corresponding picture.

Figure 4A:
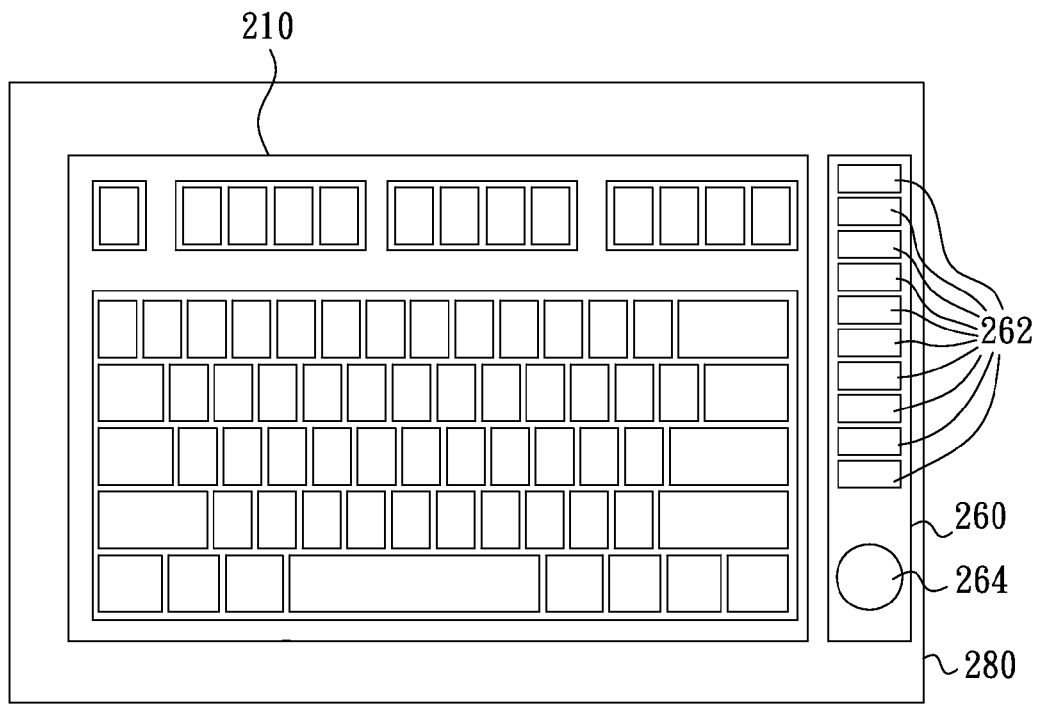
FIG. 4A and FIG. 4B show top views of the optical operating apparatus of FIG. 1 in accordance with another two different modes.
Figure 4B:
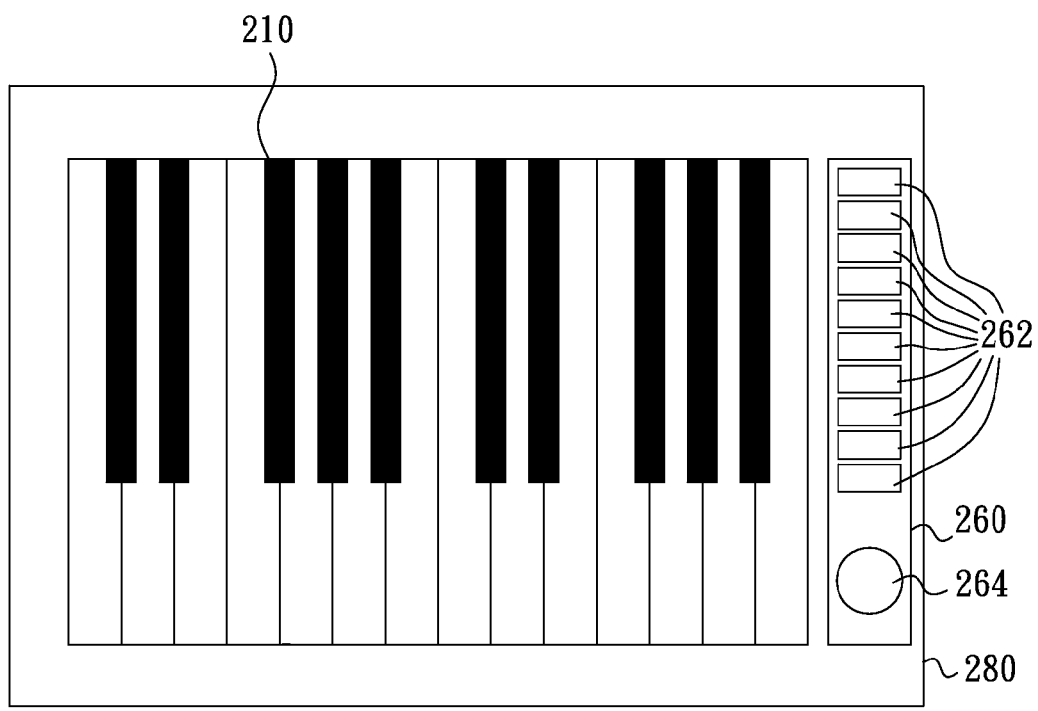

In the present embodiment, besides the drawing function, the optical operating apparatus 200 also has functions of touch pad (including mouse pad), computer keyboard, music keyboard, etc. When another predetermined function (such as a touch pad, computer keyboard or music keyboard function) is selected by pressing another function selecting button 262, a blank picture (as shown in FIG. 2), a computer keyboard picture (as shown in FIG. 4A) or a music keyboard picture (as shown in FIG. 4B) is displayed on the display panel 210 controlled by the processing module 270. It is understood that the optical operating apparatus 200 is not limited to have the above-described functions. Further, the function selecting module 260 can further include a reset button 264 for resetting the function of the optical operating apparatus 200.

In the present embodiment, the optical operating apparatus 200 has the function selecting module 260 for acquiring many operating modes. In other words, many operating devices can be replaced by the optical operating apparatus 200 of the present embodiment. Further, the optical operating apparatus 200 of the present embodiment employs an optical manner to sense a change of the pressure, therefore, any operating error caused by electrostatic force or humidity can be prevented. The pressure is not exerted on the image sensing module 250, thereby avoiding a damage of the image sensing module 250. Therefore, the optical operating apparatus 200 of the present embodiment has high reliability.

Figure 5:
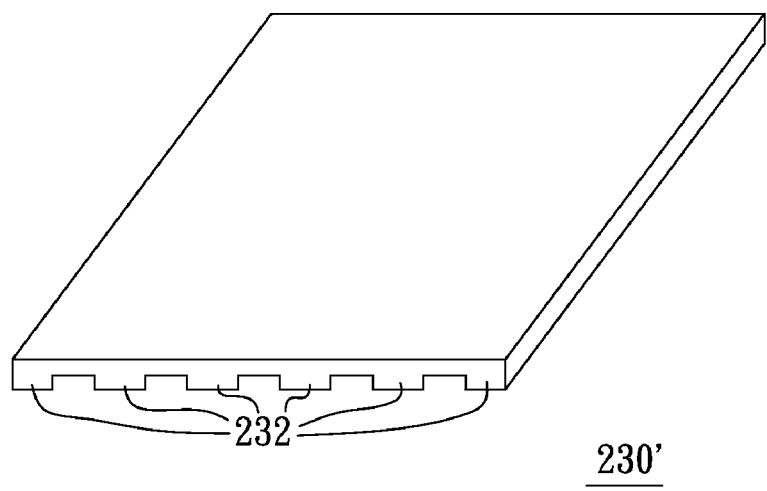
FIG. 5 is a top view of a deformable unit of the optical operating apparatus of another embodiment of the present invention.

In the present invention, it is noted that the pattern configuration of the deformable unit 230 is not limited to be reticular configuration. For example, referring to FIG. 5, in another embodiment, the deformable unit 230' of another optical operating apparatus is composed of a plurality of stripe structures 232.

Figure 6:
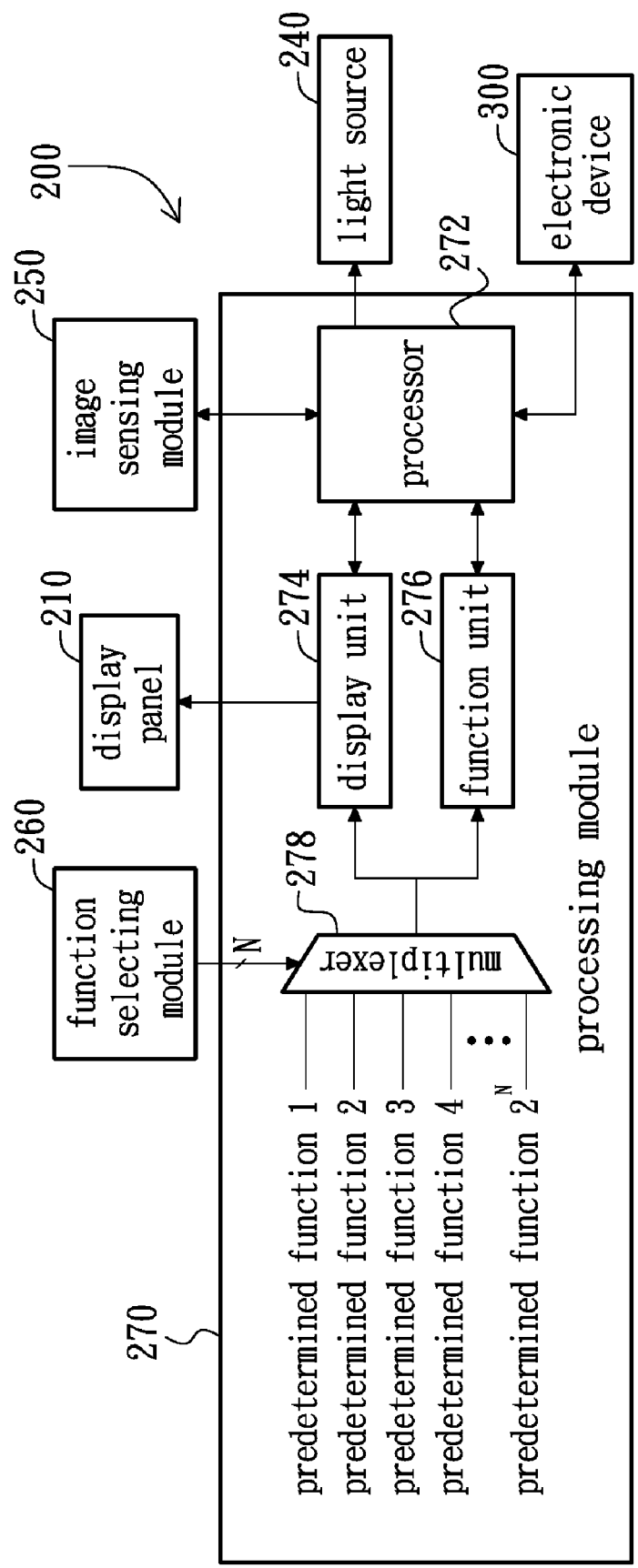
FIG. 6 is a block diagram of the optical operating apparatus of FIG. 1.

FIG. 6 is a block diagram of the optical operating apparatus of FIG. 1. Referring to FIG. 6, in the optical operating apparatus 200 of the present embodiment, the processing module 270 includes a processor 272, a display unit 274, a function unit 276 and a multiplexer 278. The processor 272 is electrically connected to the image sensing module 250 and the light source 240. The display unit 274 is electrically connected to the processor 272 and the display panel 210. The function unit 276 is electrically connected to the processor 272. The multiplexer 278 is electrically connected to the function selecting module 260, the display unit 274 and the function unit 276. The processor 272 is further electrically connected to an electronic device 300, e.g., a computer.

When the user selects one of the predetermined functions through the function selecting module 260, the multiplexer 278 transmits a signal to the display unit 274 and the function unit 276. Then, the display unit 274 controls the display panel 210 to display a predetermined picture according to the predetermined function selected by the user. The function unit 276 transmits another signal to the processor 272 so as to do corresponding operation by the processor 272 according to the selected predetermined function.

Figure 7:
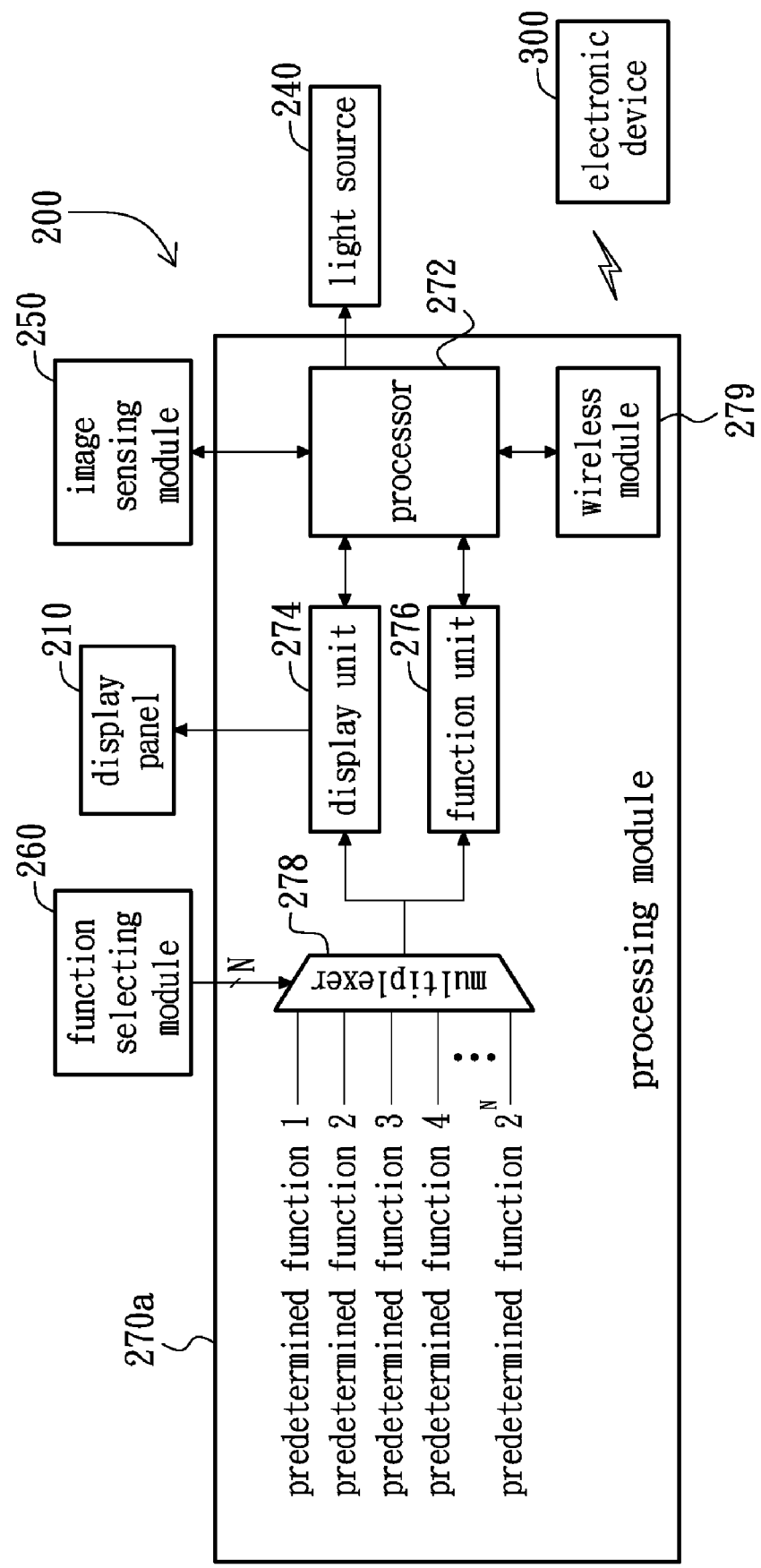
FIG. 7 is a block diagram of the optical operating apparatus of another embodiment of the present invention.

FIG. 7 is a block diagram of the optical operating apparatus of another embodiment of the present invention. Referring to FIG. 7, compared with the optical operating apparatus 200 shown in FIG. 6, a processing module 270a of an optical operating apparatus 200a of another embodiment further includes a wireless module 279. The wireless module 279 is electrically connected to the processor 272. The optical operating apparatus 200a is wirelessly connected to the electronic device 300 through the wireless module 279.

Figure 8:
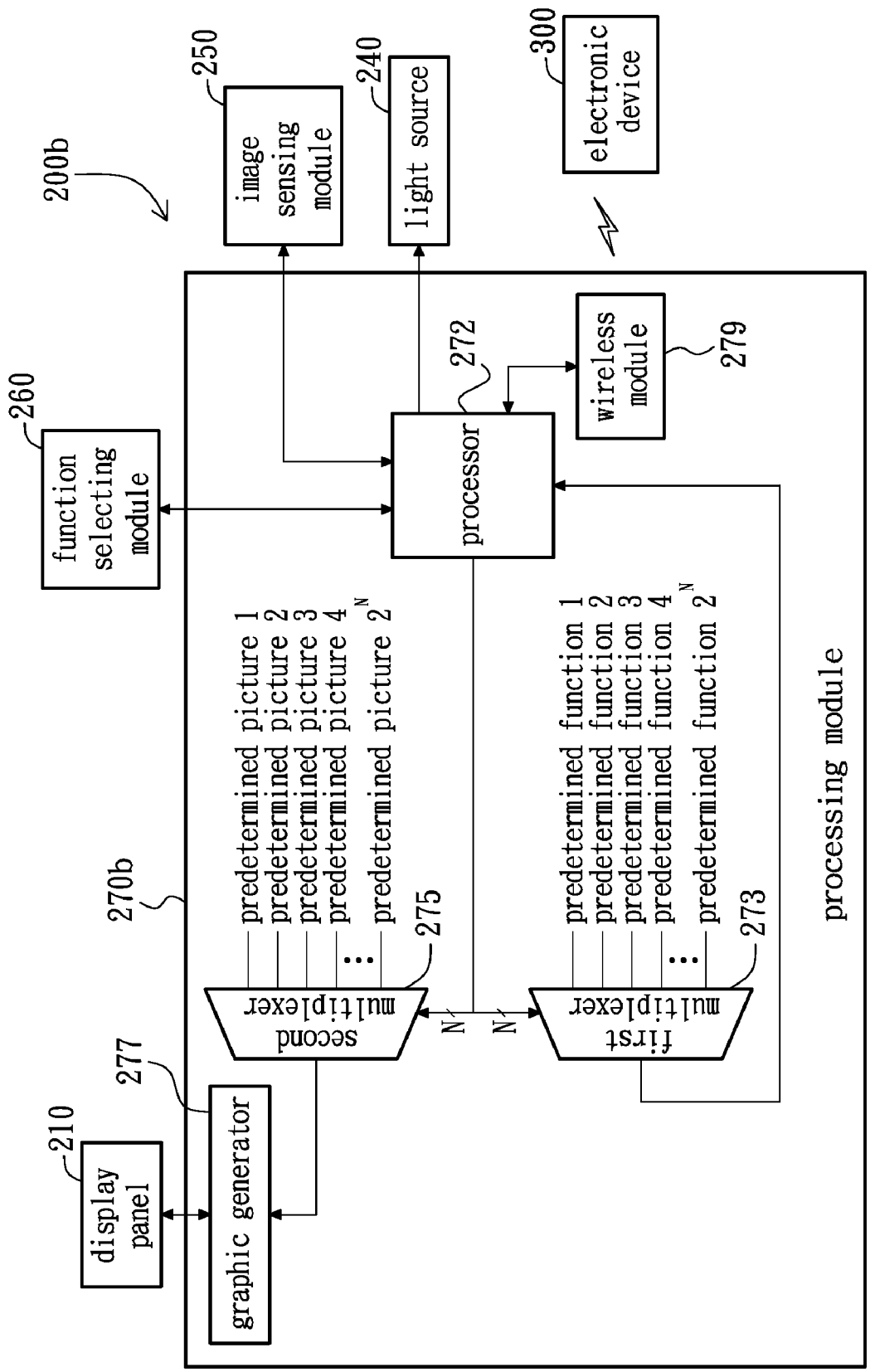
FIG. 8 is a block diagram of the optical operating apparatus of another embodiment of the present invention.

FIG. 8 is a block diagram of the optical operating apparatus of another embodiment of the present invention. Referring to FIG. 8, compared with the optical operating apparatus 200 shown in FIG. 6, an alternative lies in a processing module 270b of an optical operating apparatus 200b of another embodiment. In details, the processing module 270b of the optical operating apparatus 200b includes a processor 272, a first multiplexer 273, a second multiplexer 275 and a graphic generator 277. The processor 272 is electrically connected to the image sensing module 250, the light source 240, the function selecting module 260, the first multiplexer 273 and the second multiplexer 275. The graphic generator 277 is electrically connected to the display panel 210 and the second multiplexer 275.

When the user selects one of the predetermined functions through the function selecting module 260, the first multiplexer 273 transmits a signal to the processor 272 so as to do corresponding operation by the processor 272 according to the selected predetermined function, and the second multiplexer 275 transmits another signal to the graphic generator 277 so as to generate a graphic data by the graphic generator 277 according to the predetermined function. Then, the display panel 210 integrated with a display unit may display a predetermined picture according to the graphic data. Further, the first multiplexer 273 and the second multiplexer 275 can be integrated into the processor 272. In addition, the processing module 270b may further include a wireless module 279 which is electrically connected to the processor 272. The optical operating apparatus 200b is wirelessly connected to the electronic device 300 through the wireless module 279.

Figure 9:
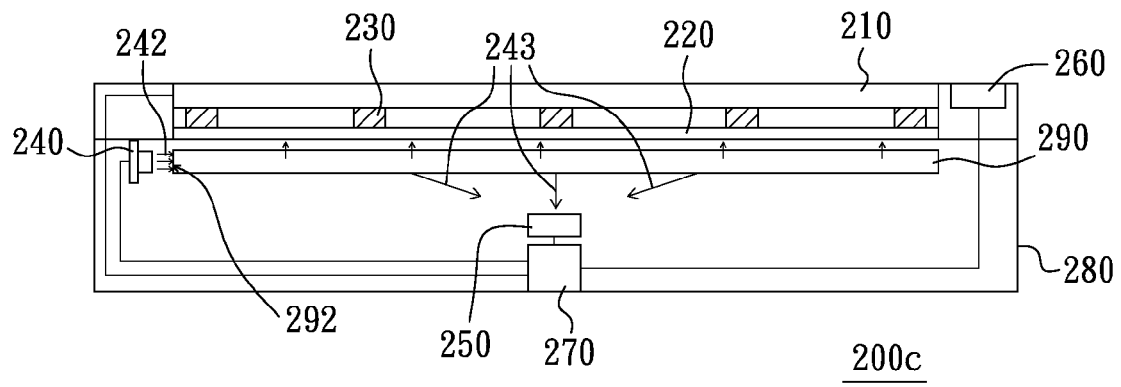
FIG. 9 is a schematic view of an optical operating apparatus of another embodiment of the present invention.

FIG. 9 is a schematic view of an optical operating apparatus of another embodiment of the present invention. Referring to FIG. 9, compared with the optical operating apparatus 200 shown in FIG. 1, the optical operating apparatus 200c of the present embodiment additionally includes a light guide plate 290. The light guide plate 290 is disposed between the transparent supporting plate 220 and the image sensing module 250. The light source 240 is arranged adjacent to a light incident surface 292 of the light guide plate 290. The light guide plate 290 can guide the light beam 243 provided by the light source 240 to the deformable unit 230. The light guide plate 290 may not reduce the image quality of the deformable unit 230 captured by the image sensing module 250, but to facilitate the image sensing module 250 determining the deformed position and the deformed size of the deformable unit 230.

Figure 10:
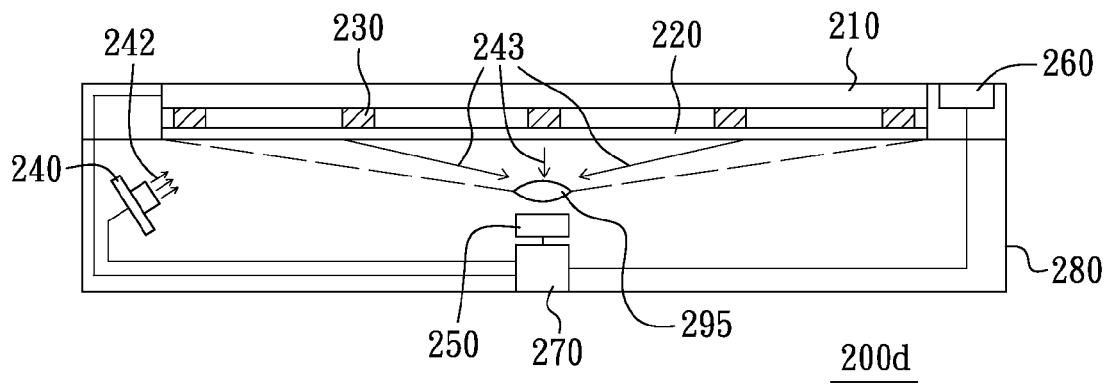
FIG. 10 is a schematic view of an optical operating apparatus of another embodiment of the present invention.

FIG. 10 is a schematic view of an optical operating apparatus of another embodiment of the present invention. Referring to FIG. 10, compared with the optical operating apparatus 200 of FIG. 1, the optical operating apparatus 200d of the present embodiment additionally includes a lens 295. The lens 295 is disposed in front of the image sensing module 250. Because the lens 295 has a large viewing angle, a distance between the image sensing module 250 and the deformable unit 230 can be shorten due to the exist of the lens 295. Therefore, a thickness of the optical operating apparatus 200d can be reduced.

In summary, the optical operating apparatus has the following advantages:

1. The optical operating apparatus employs an optical manner to sense a pressure, therefore, any operating error caused by electrostatic force or humidity can be prevented.

2. The pressure is not exert on the image sensing module, thereby avoiding a damage of the image sensing module and the optical operating apparatus has high reliability.

3. The optical operating apparatus has a function selecting module which has multiple operating modes, therefore, many operating device can be replaced by the optical operating apparatus.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An optical operating apparatus, comprising:
a display panel;
a transparent supporting plate disposed under the display panel;
a deformable unit disposed between the display panel and the transparent supporting plate, the deformable unit having a pattern configuration, wherein the deformable unit deforms as applying an external force on the display panel and restores after the external force is removed;
a light source configured for providing a light beam to the transparent supporting plate and the deformable unit;
an image sensing module disposed on a transmitting path of the light beam reflected by the deformable unit, and a visual field of the image sensing module covering the whole deformable unit;
a function selecting module disposed beside the display panel, the function selecting module having a plurality of function selecting buttons for selecting one of predetermined functions; and
a processing module electrically connected to the display panel, the function selecting module, the image sensing module and the light source, wherein the processing module is configured to control the display panel to display a predetermined picture according to the predetermined function selected by an user, and process an operating motion exerted on the predetermined picture.

2. The optical operating apparatus as claimed in claim 1, wherein the deformable unit is made of an elastic material.

3. The optical operating apparatus as claimed in claim 1, wherein the pattern configuration is a predetermined reticular structure or a multi-line shaped structure.

4. The optical operating apparatus as claimed in claim 1, wherein the image sensing module is disposed under the transparent supporting plate.

5. The optical operating apparatus as claimed in claim 4, further comprising a light guide plate disposed between the transparent supporting plate and the image sensing module, and the light source being disposed adjacent to an incident surface of the light guide plate.

6. The optical operating apparatus as claimed in claim 1, wherein the display panel is a dot-matrix liquid crystal display panel.

7. The optical operating apparatus as claimed in claim 1, wherein the processing module comprises:
  a processor electrically connected to the image sensing module and the light source;
  a display unit electrically connected to the processor and the display panel;
  a function unit electrically connected to the processor; and
  a multiplexer electrically connected to the function selecting module, the display unit and the function unit,
  wherein on condition that one of the predetermined functions is selected, the multiplexer is capable of transmitting a signal to the display unit and the function unit, the display unit is capable of controlling the display panel to display a predetermined picture according to the predetermined function, and the function unit is capable of transmitting another signal to the processor to enable the processor doing a corresponding operation according to the selected predetermined function.

8. The optical operating apparatus as claimed in claim 7, wherein the processing module further comprises a wireless module electrically connected to the processor.

9. The optical operating apparatus as claimed in claim 1, wherein the processing module comprises:
  a processor electrically connected to the image sensing module, the light source and the function selecting module;
  a first multiplexer electrically connected to the processor;
  a second multiplexer electrically connected to the processor;
  a graphic generator electrically connected to the display panel and the second multiplexer,
  wherein on condition that one of the predetermined functions is selected, the first multiplexer is capable of transmitting a signal to the processor to enable the processor doing a corresponding operation according to the selected predetermined function, the second multiplexer is capable of transmitting another signal to the graphic generator to enable the graphic generator generating a graphic data according to the predetermined function, and the display panel integrated with a display unit is capable of displaying a predetermined picture according to the graphic data.

10. The optical operating apparatus as claimed in claim 9, wherein the processing module further comprises a wireless module electrically connected to the processor, and the optical operating apparatus is wirelessly connected to an outer electronic device through the wireless module.

11. The optical operating apparatus as claimed in claim 1, further comprising a lens disposed in front of the image sensing module.

\* \* \* \* \*